United States Patent [19]

Markert et al.

[11] 4,182,882

[45] Jan. 8, 1980

[54] PROCESS FOR THE PRODUCTION OF PYRANTHRONES OR FLAVANTHRONES

[75] Inventors: Jurgen Markert, Ettingen; Hans Morawietz, Aesch, both of Switzerland

[73] Assignee: Ciba-Geigy Corporation, Ardsley, N.Y.

[21] Appl. No.: 886,203

[22] Filed: Mar. 13, 1978

[30] Foreign Application Priority Data

Mar. 22, 1977 [CH] Switzerland .................. 3570/77

[51] Int. Cl.² .......................... C09B 3/42; C09B 5/20
[52] U.S. Cl. ...................................... 546/31; 260/360
[58] Field of Search ................ 260/273, 360; 546/31

[56] References Cited

U.S. PATENT DOCUMENTS

| 2,855,408 | 10/1958 | Dettwyler | 260/360 |
|---|---|---|---|
| 3,446,810 | 5/1969 | Dien et al. | 260/273 |
| 3,673,220 | 6/1972 | Bock | 260/360 |
| 3,723,479 | 3/1973 | Schuhmacher | 260/273 |

*Primary Examiner*—Paul M. Coughlan, Jr.
*Attorney, Agent, or Firm*—Prabodh I. Almaula

[57] ABSTRACT

A process for the production of pyranthrones or flavanthrones which comprises reacting substituted or unsubstituted 2,2'-dialkyl-1,1'-dianthraquinonyls or 2,2'-diacylamino-1,1'-dianthraquinonyls respectively in a two-phase system of aqueous organic solvents using quaternary ammonium or phosphonium compounds as catalysts.

10 Claims, No Drawings

PROCESS FOR THE PRODUCTION OF PYRANTHRONES OR FLAVANTHRONES

The present invention relates to a novel process for the production of pyranthrones or flavanthrones from 2,2'-dialkyl-1,1'-dianthraquinonyls or 2,2'-diacylamino-1,1'-dianthraquinonyls respectively.

It is known from German patent specification No. 175.067 that pyranthrones can be obtained by heating 2,2'-dimethyl-1,1'-dianthraquinonyls in alkali hydroxide melts, optionally in the presence of alcohols, to temperatures of 140° to 250° C.

The drawback of this process is that such alkali hydroxide melts are difficult to handle and that the process products constantly contain impurities which greatly limit their use as dyes, especially as pigment dyes. This deficiency can only be rectified by means of complicated and uneconomic cleansing operations.

In addition, according to German Offenlegungsschrift No. 1,951,708 pyranthrones are produced by heating 2,2'-dialkyl-1,1'-dianthraquinonyls in polar organic solvents and in the presence of alkali acetates to 150° C. to 210° C. As solvents, N-methylpyrrolidone, dipropylene glycol, dimethyl formamide and dimethyl acetate are for example mentioned.

The disadvantages of this process are that the solvents are difficult to recover and the reaction temperature is too high.

A search was therefore made to find a process which enables flavanthrones or pyranthrones to be obtained in simple manner and in the required high purity using ecologically safe technology, i.e., an easy working up of the reactants, and an energy-saving process.

In the novel process, which fulfills these conditions, the pyranthrones or flavanthrones are produced by reacting substituted or unsubstituted 2,2'-dialkyl-1,1'-dianthraquinonyls or 2,2'-diacylamino-1,1'-dianthraquinonyls respectively in a two-phase system of aqueous organic solvents using quaternary ammonium or phosphonium compounds as catalysts.

Suitable starting materials for the novel process are in particular 2,2'-dialkyl-1,1'-dianthraquinonyls or 2,2'-diacylamino-1,1'-dianthraquinonyls of the formula I

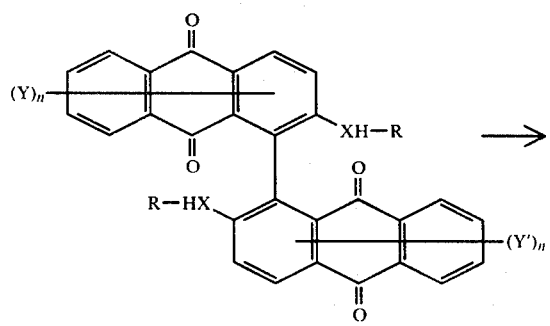

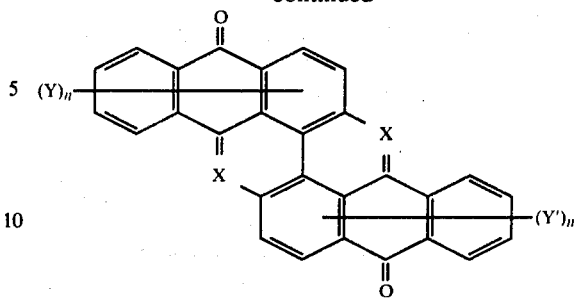

from which the pyranthrones or flavanthrones of the formula II are formed. In the formulae I and II, X represents CH or N, and Y and Y' represent identical or different halogen atoms, especially chlorine and bromine, $C_1$-$C_4$alkyl, $C_1$-$C_4$alkoxy, and n is an integer from 0 to 5, and R is hydrogen if X is CH or R is the acyl radical of a monobasic or dibasic acid, for example acetyl or phthalimido, if X is nitrogen.

The unsubstituted pyranthrones and flavanthrones and a process for their manufacture are of particular interest.

The reaction of the compounds of the formula I is carried out in a mixture of water and a water-immiscible organic solvent or solvent mixture in the presence of 0.01 to 40 mole percent, preferably 1 to 20 mole percent, based on the amount of compound I, of quaternary ammonium or phosphonium compounds as catalysts, with efficient mixing, in a neutral to alkali pH range.

The reaction is carried out in simple reaction vessels equipped with reflux cooler and stirrer, or in an autoclave under pressure.

The reaction temperature varies in the range between 80° and 130° C., preferably between 110° and 130° C.

Catalysts which can be used in the process of the invention are quaternary ammonium or phosphonium compounds, for example tetrabutylammonium bromide or chloride, dodecyltrimethylammonium chloride, n-hexadecyltributylammonium chloride, tetrapropylammonium chloride, n-hexadecyltributylphsophonium chloride, benzyltriethylammonium chloride, benzyltributylammonium chloride, benzyltrihexylammonium bromide, benzyltrioctylammonium bromide, tetrabutylammonium iodide, trioctylmethylammonium chloride, N-octylpyridinium bromide, N-dodecylpyridinium bromide, cyclohexyltriethylammonium bromide, n-dodecyltriethylammonium bromide, n-octyltributylammonium bromide, n-hexadecyltrimethylammonium bromide, n-hexadecyltriethylammonium bromide, n-hexadecyltripropylammonium bromide, tetrabutylphosphonium chloride, tetraphenylphosphonium bromide, trioctylethylphosphonium bromide, n-didecyl-bis(β-hydroxyethyl)-benzylammonium chloride and n-hexadecyl-tri-(β-hydroxyethyl)-ammonium chloride.

It is advantageous if the catalysts are soluble both in water and in the organic solvents employed. Preferred catalysts are: tetrabutylammonium bromide or chloride, n-hexadecyltributylammonium chloride, tetrapropylammonium chloride, n-hexadecyltributylphosphonium bromide, benzyltributylammonium bromide or chloride, trioctylmethylammonium bromide or chloride.

The reaction is carried out in a neutral to alkaline medium and alkali lyes are advantageously used for the alkalinity adjustment, for example sodium or potassium hydroxide.

The amount of alkali used can vary within wide limits and is 0.1 to 10 times, most preferably two or four times, the amount of starting material.

Suitable water-immiscible organic solvents are for example aliphatic and aromatic chlorinated hydrocarbons, such as carbon tetrachloride, trichloroethylene, especially methylene chloride, and chloroform, or mono- and dichlorobenzene; but in particular those solvents whose recovery is effected as easily as possible in respect of an optimum carrying out of the process, for example toluene, xylene, nitrobenzene, chlorotoluene, trichlorobenzene (isomeric mixture), and especially chlorobenzene and o-dichlorobenzene. All solvents are recovered by steam distillation and can be re-used afterwards.

The process can be carried out for example in such a manner that the catalyst is dissolved in the water-immiscible solvent in a reaction autoclave and this solution is made alkaline by the addition of aqueous alkali lyes. The water content of the alkali lyes suffices in general for the formation of the two-phase mixture of aqueous water immiscible organic solvent.

With good stirring, the reaction substrate of the formula I is charged in and stirred for 1 to 3 hours at the above mentioned temperature.

The precipitated reaction product of the formula II is filtered off and washed with fresh organic solvent of the same kind as used previously. The filter cake is washed neutral with hydrochloric acid. Before it is dried, the product is advantageously freed from solvent by means of steam distillation.

Mother liquor and wash solvent are collected and worked up, for example by distillation, for re-use.

The novel process also allows the use of process variants in which different operations can be carried out in the same solvent.

It is known from Ullmanns Encyclopädie der technischen Chemie, 4th. edition (1973), Vol. 7, page 623, to carry out the cyclisation reaction of 2,2'-dimethyl-1,1'-bianthraquinonyl to give pyranthrone in a strongly alkaline medium and to effect the subsequent halogenation, after first isolating the pyranthrone, in a strongly acid medium, for example chlorosulphonic acid.

Surprisingly, it has now been observed that this reaction sequence can be much easier carried out by the novel process if the halogenation of 2,2'-dimethyl-1,1'-bianthraquinonyl is effected in an organic solvent, for example, o-dichlorobenzene, and the cyclisation reaction with the moist filter cake is carried out in the same solvent, namely dichlorobenzene. It is thereby possible to obtain the technically interesting halogenated pyranthrones more easily in respect of the process employed and, especially, also more cheaply, then hitherto.

The compounds of the formula II obtained by the novel process are valuable dyes which are extremely suitable for dyeing cotton.

The manner in which the process of the present invention is carried out is simple and the solvent employed can be recovered for use with the next batch, for example by steam distillation, after working up the reaction mixture. In addition to the purely technical advantages, the novel process affords in particular ecological ones.

The following Examples illustrate the method of carrying out the process of the present invention without implying any restriction to what is described therein. The parts are by weight.

EXAMPLE 1

Cyclisation reaction to give the pyranthrone: In an autoclave, 3.2 parts of tetrabutylammonium bromide (catalyst) are dissolved in 150 ml of o-dichlorobenzene and 30 ml of a 30% aqueous solution of sodium hydroxide are added to the solution. With good stirring of the two-phase mixture, 44.2 parts of 2,2'-dimethyl-1,1'-bianthraquinonyl are added and the mixture is stirred for 2 hours at 120° C. The precipitated reaction product is then collected by filtration and washed with 200 ml of o-dichlorobenzene in portions. Mother liquor and wash solvent are recovered by steam distillation and re-used for further batches. To remove any small amount of solvent remaining, the filter cake, after neutralisation with hydrochloric acid, is subjected to steam distillation, and the reaction product is collected by filtration and dried in vacuo. Yield: 37.8 parts (93% of theory) of the reaction product of the formula

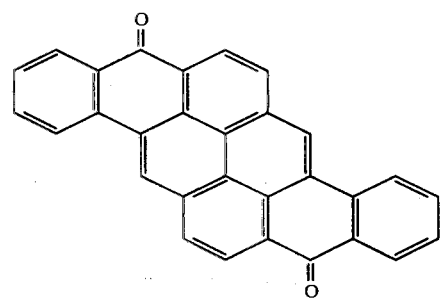

which is able to dye cotton in strong golden yellow shades of very good fastness properties.

By repeating the procedure described in this Example, but increasing the amount of sodium hydroxide solution to 80–90 ml, the amount of tetrabutylammonium bromide used as catalyst can be reduced to 2.5 parts, while obtaining the reaction product in the same yield and purity.

EXAMPLE 2

The procedure described in Example 1 is repeated, using 7.12 parts of benzyltributylammonium bromide as catalyst instead of tetrabutylammonium bromide. Yield of pyranthrones: 37.4 parts (93% of theory).

EXAMPLE 3

The procedure described in Example 1 is repeated, using 57 parts of brominated 2,2'-dimethyl-1,1'-bianthraquinonyl (bromine content = about 25%) as starting material. Yield: 47 parts (89% of theory) of the reaction product of the formula

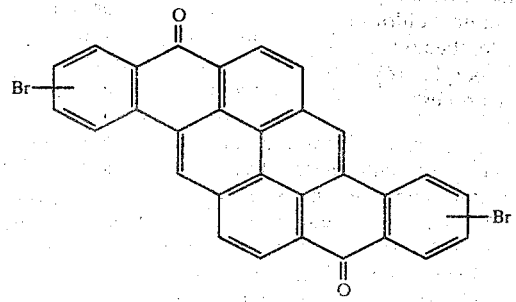

which dyes cotton in strong golden orange shades of excellent fastness properties.

EXAMPLE 4

The procedure of Example 1 is repeated, using 25.5 parts of 2,2'-dimethyl-3,3'-dichloro-1,1'-bianthraquinonyl as starting material. Yield: 43 parts of 6,14-dichloropyranthrone of the formula

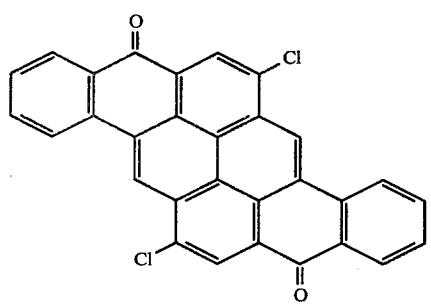

which, as pigment dye, is able to colour polyvinyl chloride, polystyrene, polyethylene or polypropylene with excellent fastness properties.

EXAMPLE 5

Cyclisation reaction to give the flavanthrone: In a stirred flask, 5.28 parts of 2,2'-diacetylamino-1,1'-dianthraquinonyl are suspended in 25 ml of chlorobenzene and 0.16 part of tetrabutylammonium bromide (catalyst) and 10 ml of a 30% aqueous solution of sodium hydroxide are added. With good stirring, the two-phase mixture is heated for 4 hours with reflux cooling. After this time, no more starting material can be detected by chromatography. The chlorobenzene is separated by steam distillation and the precipitated reaction product of the formula

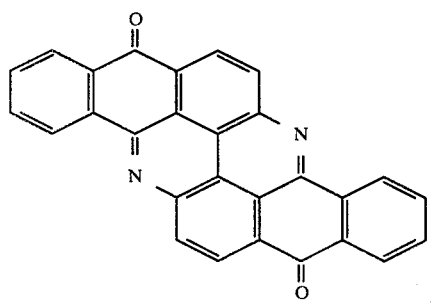

is collected by filtration, washed neutral with water and dried in vacuo.

Yield: 3.8 parts (93% of theory) of flavanthrone, which dyes cotton from the vat in strong yellow shades.

EXAMPLE 6

A solution of 2.56 parts of tetrabutylammonium bromide (catalyst) in 200 ml of technical monochlorotoluene ("Halso 99," available from Hooker Chemicals) and 40 ml of a 30% aqueous solution of sodium hydroxide are charged into a 0.5 liter steel autoclave. With good stirring of the two-phase mixture, 22.1 parts of 2,2'-dimethyl-1,1'-bianthraquinonyl are added and the mixture is stirred for 3 hours at 120° C. The precipitated reaction product is collected by filtration and washed with a total amount of 200 ml of technical monochlorotoluene in portions. To remove any small amount of solvent remaining, the filter cake, after neutralisation with dilute hydrochloric acid, is subjected to steam distillation and the reaction product is collected by filtration and dried in vacuo.

Yield: 18.5 parts (91% of theory) of pyranthrone in the form of a yellowish-brown crystalline product which thin-layer chromatography shows to be pure. The solvent is recovered by steam distillation and used for further batches.

What is claimed is:

1. A process for the production of pyranthrones or flavanthrones (II), which comprises reacting substituted or unsubstituted 2,2'-dialkyl-1,1'-dianthraquinoyls or 2,2'-diacyl-amino-1,1'-dianthraquinoyls (I) respectively in a two-phase system of a mixture of water and a water-immiscible organic solvent or solvent mixture in the presence of 0.01 to 40 mole percent, based on the amount of the compound (I), of quaternary ammonium or phosphonium compounds as catalysts, with good stirring, in neutral to alkaline pH range between 80° and 130° C.

2. A process as claimed in claim 1 which comprises the use of 2,2'-dialkyl-1,1'-dianthraquinonyls or 2,2'-diacylamino-1,1'-dianthraquinonyls of the formula I

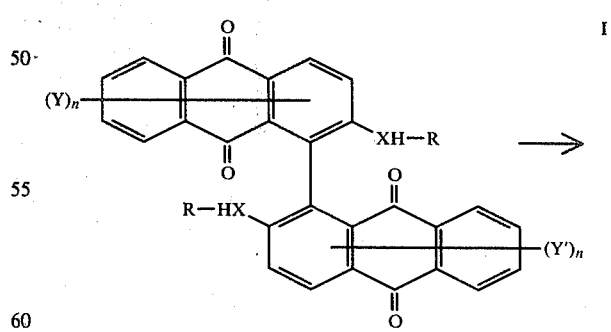

wherein X represents CH or N and Y and Y' represent identical or different chlorine and bromine, $C_1$–$C_4$alkyl, $C_1$–$C_4$alkoxy, R represents hydrogen if X is CH or R represents acetyl or phthalimido if X is N, and n is an integer from 0 to 5, to give respectively the pyranthrones or flavanthrones of the formula II

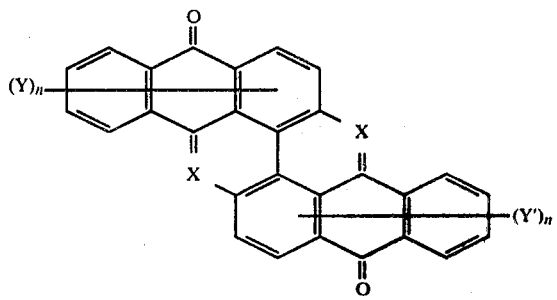

wherein X, Y, Y' and n are as defined in formula (I).

3. A process as claimed in claim 1 for the production of unsubstituted flavanthrones or pyranthrones.

4. A process as claimed in claim 1, wherein the reaction is carried out between 110° and 130° C.

5. A process as claimed in claim 1 which comprises the use of catalysts which are soluble both in water and in the organic solvents employed.

6. A process as claimed in claim 1 wherein the catalysts are tetrabutylammonium bromide or chloride, n-hexadecyltributylammonium chloride, tetrapropylammonium chloride, n-hexadecyltributylammonium chloride, benzyltributylammonium bromide or chloride, trioctylmethylammonium bromide or chloride.

7. A process as claimed in claim 1, wherein aliphatic and aromatic chlorinated hydrocarbons are used as water-immiscible organic solvents.

8. A process as claimed in claim 7 wherein carbon tetrachloride, trichloroethylene, methylene chloride, chloroform, o-chlorotoluene, trichlorobenzene (isomeric mixture), or mono- or dichlorobenzene, are used as water-immiscible solvents.

9. A process as claimed in claim 1, wherein toluene, xylene or nitrobenzene are used as water-immiscible organic solvents.

10. A process as claimed in claim 1, wherein the reaction is carried out in the presence of 1 to 20 mole percent, based on the amount of the compound (I), of quaternary ammonium or phosphonium compounds as catalysts.

* * * * *

UNITED STATES PATENT AND TRADEMARK OFFICE
CERTIFICATE OF CORRECTION

PATENT NO. : 4,182,882
DATED : January 8, 1980
INVENTOR(S) : Jurgen Markert et al.

It is certified that error appears in the above—identified patent and that said Letters Patent is hereby corrected as shown below:

On the Title Page delete "(73) Assignee: Ciba-Geigy Corporation, Ardsley, N. Y.".

Signed and Sealed this

Twenty-seventh Day of May 1980

[SEAL]

Attest:

SIDNEY A. DIAMOND

Attesting Officer

Commissioner of Patents and Trademarks